United States Patent
Bixel et al.

(10) Patent No.: US 6,181,099 B1
(45) Date of Patent: Jan. 30, 2001

(54) METHOD AND APPARATUS FOR CORRECTING DC OFFSET IN A FREQUENCY TO VOLTAGE CONVERTER AND MOTOR DRIVE USING THE SAME

(75) Inventors: Paul S. Bixel, Salem; Robert Villamil, Roanoke, both of VA (US); Mark E. Cardinal, Altamont, NY (US)

(73) Assignee: General Electric Company, Schenectady, NY (US)

( * ) Notice: Under 35 U.S.C. 154(b), the term of this patent shall be extended for 0 days.

(21) Appl. No.: 09/453,280

(22) Filed: Dec. 3, 1999

(51) Int. Cl.[7] .................................................. G05B 11/42
(52) U.S. Cl. ..................... 318/610; 318/801; 318/808; 318/810; 318/812; 340/870.21; 327/307; 341/157
(58) Field of Search ........................... 318/610, 808, 318/810, 811, 800, 801, 812; 340/870.21; 363/95, 98; 327/307; 341/118, 120, 157

(56) References Cited

U.S. PATENT DOCUMENTS 4,249,120 * 2/1981 Earle .................................... 318/729
5,053,688 * 10/1991 Rees .................................... 318/599
5,105,352 * 4/1992 Iwasa et al. ........................ 363/98
6,014,065 * 1/2000 Nishikawa ......................... 332/103
6,091,281 * 7/2000 Yoshida .............................. 327/532

FOREIGN PATENT DOCUMENTS 60-242540 * 12/1985 (JP) ........................................ 360/71
3-238352 * 10/1991 (JP) ...................................... 324/160

* cited by examiner

Primary Examiner—Robert E. Nappi
Assistant Examiner—Edgardo San Martin
(74) Attorney, Agent, or Firm—Nixon Peabody LLP

(57) ABSTRACT

A method and apparatus for correcting DC offset in a frequency to voltage converter. An analog frequency to voltage converter receives a frequency signal and outputs a voltage signal having a level that is indicative of the frequency of the frequency signal. The frequency signal is also input into a digital processor which converts the frequency signal into a reference signal that is fed back and summed with the voltage signal. The processor integrates the difference between the reference signal and the output signal to drive the output signal to be equal to the reference signal thereby nullifying DC offset in the output signal. The invention can be applied to controlling the DC bus voltage in a variable frequency AC drive.

24 Claims, 1 Drawing Sheet

METHOD AND APPARATUS FOR CORRECTING DC OFFSET IN A FREQUENCY TO VOLTAGE CONVERTER AND MOTOR DRIVE USING THE SAME

BACKGROUND OF THE INVENTION

The invention relates generally to signal correction and more particularly to correcting DC offset in the output of a frequency to voltage converter such as that used in the protection circuit of a motor drive.

The use of motor drives for controlling the speed and/or torque of motors, such as AC induction motors, is well known. Typically, an AC motor drive includes a rectifier section for converting an AC input voltage into a DC voltage for charging a DC bus and an inverter section comprising switching bridges for generating a three phase AC output signal, or an approximation thereof that cause sinusoidal current in the motor, for driving a three phase AC motor. The switching bridges include switching elements that can be controlled in a known manner to vary the frequency of the output signal to thereby control the motor in a desired manner.

Known motor drives include various protection functions and other control functions. Often these functions are accomplished by a microprocessor based controller programmed in a desired manner or analog circuits. For example, it is known to provide regulation of the DC bus voltage for the purpose of overvoltage protection during regenerative braking and/or operation anomalies. It is desirable to electrically isolate the regulation circuit from the DC bus to prevent damage to the regulation circuit. Accordingly, it is known to use a voltage to frequency converter to convert the DC bus voltage to a signal having a frequency that is related to the DC bus voltage, to convert the frequency signal to light pulses, and to transmit the light pulses over a fiber optic link to the protection circuit. A frequency to voltage converter associated with the protection circuit converts the frequency signal back to a voltage signal to permit voltage regulation in a known manner.

There are two conventional types of protection circuits. The first type of protection circuit is an analog circuit that uses known analog components to convert the frequency signal to a voltage signal. Analog circuits are very responsive, i.e. fast. However, analog circuits have an inherent DC offset. In fact, it is difficult to reduce the analog offset to less than ±2%, even when using high grade, expensive components. In many applications, the error due to the DC offset is unacceptable.

The second type of protection circuit is a digital circuit that uses a programmed microprocessor based device and interface components to convert the frequency signal to a voltage signal. Digital protection circuits can be very accurate and are not subject to DC offset problems associated with analog circuits. However, a digital protection circuit must accumulate or sample the pulses of the frequency signal and thus is inherently unresponsive, i.e. slow.

BRIEF SUMMARY OF THE INVENTION

A first aspect of the invention is an apparatus for correcting a DC offset in a frequency to voltage conversion circuit comprising an analog conversion circuit having a frequency to voltage converter and being adapted to receive a frequency signal and convert the frequency signal to a voltage signal having a voltage that varies with the frequency of the frequency signal, and a digital processor adapted to receive the frequency signal and the voltage signal and generate a correction signal that is fed back to the analog conversion circuit to correct DC offset in the voltage signal.

A second aspect of the invention is a method for correcting a DC offset in a frequency to voltage conversion circuit comprising the steps of converting a frequency signal to a voltage signal with an analog circuit, integrating the difference between the voltage signal and the frequency signal to obtain a correction signal, and summing the correction signal and the voltage signal to correct the voltage signal for DC offset.

A third aspect of the invention is an apparatus for correcting a DC offset in a frequency to voltage conversion circuit comprising analog means for converting a frequency signal to a voltage signal, means for integrating the difference between the voltage signal and the frequency signal to obtain a correction signal, and means for summing the correction signal and the voltage signal to correct the voltage signal for DC offset.

A fourth aspect of the invention is an apparatus for correcting a DC offset in a frequency to voltage conversion circuit comprising an analog conversion circuit having a frequency to voltage converter and a summing junction and being adapted to receive a frequency signal and convert the frequency signal to a voltage signal having a voltage that varies with the frequency of the frequency signal, an analog to digital converter coupled to the analog frequency converter to convert the voltage signal to a digital signal, a digital processor adapted to receive the frequency signal and the digital signal, calculate a reference signal based on the frequency signal, calculate a feedback signal based on the digital signal, and integrate the difference between the reference signal and the feedback signal to generate a digital correction signal, and a digital to analog converter coupled to the digital processor and the analog conversion circuit to convert the digital correction signal to an analog correction signal and input the analog correction signal to the summing junction to thereby correct DC offset in the voltage signal.

A fifth aspect of the invention is a motor drive for controlling a motor comprising a DC bus, plural switching bridges coupled to the DC bus, a controller operative to gate the switching bridges to generate a voltage signal to drive a motor, a voltage to frequency converter coupled to the DC bus and being operative to generate a frequency signal having a frequency indicative of voltage of the DC bus, an analog conversion circuit having a frequency to voltage converter and a summing junction and being coupled to the voltage to frequency converter to receive the frequency signal and convert the frequency signal to an output signal having a voltage that varies with the frequency of the frequency signal, an analog to digital converter coupled to the analog frequency converter to convert the output signal to a digital signal, a digital processor adapted to receive the frequency signal and the digital signal, calculate a reference signal based on the frequency signal, calculate a feedback signal based on the digital signal, and integrate the difference between the reference signal and the feedback signal to generate a digital correction signal, and a digital to analog converter coupled to the digital processor and the analog conversion circuit to convert the digital correction signal to an analog correction signal and input the analog correction signal to the summing junction of the analog conversion circuit to thereby correct DC offset in the output signal.

BRIEF DESCRIPTION OF THE DRAWINGS

The invention is described through a preferred embodiment and the attached drawing in which.

DETAILED DESCRIPTION OF THE INVENTION

Figure 1:
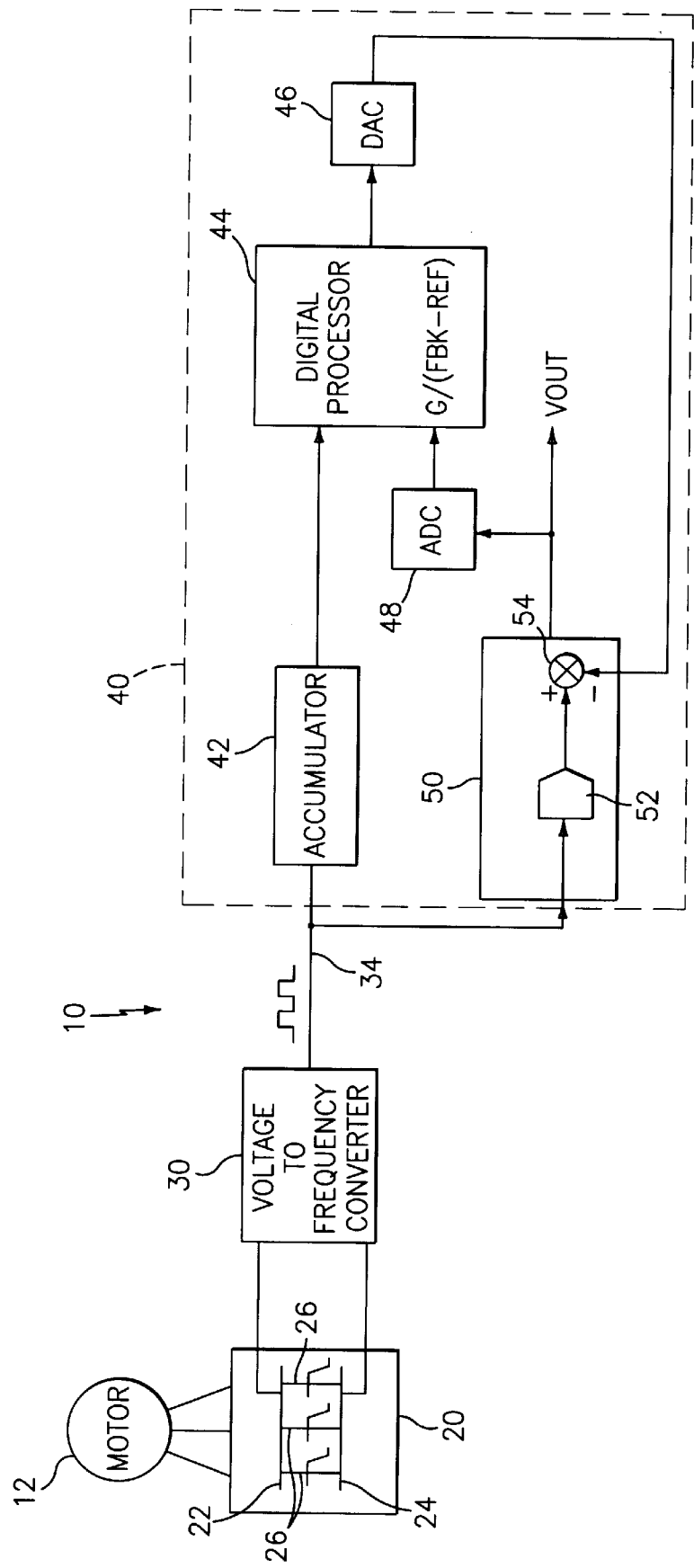
FIG. 1. is a schematic illustration of a motor drive system utilizing a correction circuit of the preferred embodiment.

FIG. 1 illustrates a preferred embodiment of a correcting apparatus in a voltage regulation circuit for the DC bus of a motor drive system. System 10 includes motor 12, a three phase AC induction motor for example, inverter section 20, voltage to frequency converter 30, and correction circuit 40. Inverter section 20 includes positive DC bus 22, negative DC bus 24, and switching bridges 26 (one for each phase) which can comprise thyristors, silicon controlled rectifiers, or any other switching elements. Bridges 26 are gated by a controller in a predetermined manner to generate a three phase output for driving motor 12 in a known manner.

Voltage to frequency converter 30 includes known components for converting a DC voltage input into an output of optical pulses having a frequency that is indicative of the DC voltage. For example, the frequency of the pulses of the output of voltage to frequency converter 30 can be proportional to the voltage of the input thereof. As illustrated, voltage to frequency converter 30 is coupled to DC buses 24 and 26 so that the voltage across DC busses 24 and 26 is the input to voltage to frequency converter 30. The connection between voltage to frequency converter 30 and busses 24 and 26 is illustrated in a schematic manner only and can include appropriate conductors, attenuators, terminations, filters, fuses and the like as is well known. The output signal of voltage to frequency converter 30 is a train of light pulses having a frequency that varies based on the input signal, i.e. the voltage across DC buses 22 and 24. Optical communication medium 34 is coupled to voltage to frequency converter 30 to transmit the light pulses to correction circuit 40 in a known manner. For example, optical communication medium 34 can include an optical fiber and appropriate couplings as is well known.

The pulse signal, i.e. frequency signal, transmitted by optical communication medium 34 is input into accumulator 42 and analog conversion circuit 50. Accumulator 42 counts the pulses over a predetermined period of time and outputs the total over the period to digital processor 44. For example, digital processor 44 can read the contents of accumulator 42 every 333 μs and can compute the frequency of the optical pulse signal based on the accumulator value. Digital processor 44 converts the frequency to a number, i.e. a reference value, corresponding to the voltage of DC buses 22 and 24 in a known manner. This conversion process is very accurate at low frequencies and produces negligible DC offset. Digital processor 44 can be a microprocessor based device programmed in a known manner and can actually be constituted of the controller of the motor drive controlling motor 12. Of course, accumulator 42 includes elements for converting the optical signal into an electrical signal that is suitable for input into digital processor 44.

The signal transmitted by optical communication medium 34 is also fed to analog conversion circuit 50, as noted above. Analog conversion circuit 50 includes frequency to voltage converter 52, for converting the optical pulse signal into an electric voltage signal indicative of the frequency of the pulses, and summing junction 54. The output of analog conversion circuit 50 is coupled to analog to digital converter (ADC) 48 to convert the output signal to a digital signal, in a known manner, appropriate for input into digital processor 44. Digital processor 44 converts this input to a number, i.e. a feedback value, corresponding to the voltage across DC buses 22 and 24.

The output of digital processor 44 is coupled to digital to analog converter (DAC) 46 to convert the output signal, as a correction value, to analog form, in a known manner, which is fed to summing junction 54. Digital processor 44 integrates the difference between the feedback value derived from the output of analog conversion circuit 50 and the reference value with respect to time to create the correction value. The correction value signal thus converted to analog form by digital to analog converter 46 is fed to the negative input of summing junction 54. Accordingly the correction value is subtracted from the output of frequency to voltage converter 52 making the output (Vout) of analog conversion circuit 50 approach the reference value calculated by digital processor 44.

It can be seen that a control loop is constituted of analog conversion circuit 50 analog to digital converter 48 digital processor 44 and digital to analog Converter 46. The control loop forces the feedback value to equal the reference value at which point DC offset in analog conversion circuit 50 is substantially nullified, i.e. corrected. The output (Vout) of correction circuit 40 is indicative of the DC bus voltage and is used as an input to a controller that provides DC bus voltage regulation, such as overvoltage protection.

The invention can use known digital and analog components to accomplish the functions disclosed herein. The components can be part of a motor drive control system or can be separate components suitable for retrofitting motor drives or other equipment. The digital processor can be programmed in a known manner to accomplish the necessary calculations and other functions. The digital processor and other digital components can be the existing motor drive controller. The invention can be used in connection with voltage regulation of the DC bus in a motor drive or in any other application in which it is necessary to correct for DC offset. The various signal connections, including the communication medium coupling the voltage to frequency converter with the digital processor and the analog correction circuit, can be of any type carrying any appropriate signal. For example, the signals can be optical signals carried by optical fibers and/or electrical signals carried by electrical conductors, such as wire or cable.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. An apparatus for correcting a DC offset in a frequency to voltage conversion circuit, said apparatus comprising:
    an analog conversion circuit having a frequency to voltage converter and being adapted to receive a frequency signal and convert the frequency signal to a voltage signal having a voltage that varies with the frequency of the frequency signal; and
    a digital processor adapted to receive the frequency signal and the voltage signal and generate a correction signal that is fed back to said analog conversion circuit to correct DC offset in the voltage signal.

2. An apparatus as recited in claim 1 wherein said analog conversion circuit comprises a summing junction having inputs coupled to the correction signal and the voltage signal.

3. An apparatus as recited in claim 2, wherein said digital processor calculates a reference signal based on the frequency signal, calculates a feedback signal based on the voltage signal, and integrates the difference between the reference signal and the feedback signal to generate the correction signal.

4. An apparatus as recited in claim 3, wherein the frequency signal has a frequency that is indicative of the DC bus voltage of a motor drive.

5. An apparatus as recited in claim 3, further comprising:
a voltage to frequency converter adapted to be coupled to the DC bus to generate the frequency signal;
and an optical medium coupled between said voltage to frequency converter and said analog conversion circuit and said digital processor.

6. An apparatus as recited in claim 5, further comprising:
an analog to digital converter coupled between said analog conversion circuit and said digital processor; and
a digital to analog converter coupled between said digital processor and said summing junction.

7. A method for correcting a DC offset in a frequency to voltage conversion circuit comprising the steps of:
converting a frequency signal to a voltage signal with an analog circuit;
integrating the difference between the voltage signal and the frequency signal to obtain a correction signal; and
summing the correction signal and the voltage signal to correct the voltage signal for DC offset.

8. A method as recited in claim 7, further comprising the step of converting the voltage signal to a digital value prior to said integrating step.

9. A method as recited in claim 8, wherein said integrating step is accomplished with a digital processor and said method further comprises the step of accumulating pulses of the frequency signal as a value over time for input into the digital processor as the frequency signal.

10. A method as recited in claim 9, further comprising the step of converting the correction signal to analog form prior to said summing step.

11. A method as recited in claim 10, further comprising the steps of:
detecting the voltage of a DC bus of a variable speed AC motor drive; and
generating the frequency signal based on the voltage detected in said detecting step.

12. method as recited in claim 11, wherein said generating step comprises generating the frequency signal having a frequency that is proportional to the magnitude of voltage detected in said detecting step.

13. A method as recited in claim 11, further comprising the steps of;
converting the frequency signal from an electrical form to an optical form after said generating step; and
converting the frequency signal from an optical form to an electrical form prior to said converting step and said integrating step.

14. An apparatus for correcting a DC offset in a frequency to voltage conversion circuit comprising:
analog means for converting a frequency signal to a voltage signal;
means for integrating the difference between the voltage signal and the frequency signal to obtain a correction signal; and
means for summing the correction signal and the voltage signal to correct the voltage signal for DC offset.

15. An apparatus as recited in claim 14, further comprising means for converting the voltage signal to a digital value for input into said means for integrating.

16. An apparatus as recited in claim 15, wherein said means for integrating comprises a digital processor and said apparatus further comprises means for accumulating pulses of the frequency signal as a value over time for input into the digital processor as the frequency signal.

17. An apparatus as recited in claim 16, further comprising means for converting the correction signal to analog form for input into said means for summing.

18. An apparatus as recited in claim 17, further comprising:
means for detecting the voltage of a DC bus of a variable speed AC motor drive; and
means generating the frequency signal based on the voltage detected by said means for detecting.

19. An apparatus as recited in claim 18, wherein said means for generating comprises means for generating the frequency signal having a frequency that is proportional to the magnitude of voltage detected by said means for detecting.

20. An apparatus as recited in claim 19, further comprising;
means for converting the frequency signal from an electrical form to an optical form; and
means for converting the frequency signal from an optical form to an electrical form for input into said analog means.

21. An apparatus for correcting a DC offset in a frequency to voltage conversion circuit, said apparatus comprising:
an analog conversion circuit having a frequency to voltage converter and a summing junction and being adapted to receive a frequency signal and convert the frequency signal to a voltage signal having a voltage that varies with the frequency of the frequency signal;
an analog to digital converter coupled to said analog frequency converter to convert the voltage signal to a digital signal;
a digital processor adapted to receive the frequency signal and the digital signal, calculate a reference signal based on the frequency signal, calculate a feedback signal based on the digital signal, and integrate the difference between the reference signal and the feedback signal to generate a digital correction signal; and
a digital to analog converter coupled to said digital processor and said analog conversion circuit to convert the digital correction signal to an analog correction signal and input the analog correction signal to said summing junction to thereby correct DC offset in the voltage signal.

22. An apparatus as recited in claim 21 further comprising a voltage to frequency converter adapted to be coupled a DC bus of a motor drive for generating the frequency signal.

23. An apparatus as recited in claim 22 wherein the frequency signal has a frequency that is proportional to the voltage on the DC bus.

24. A motor drive for controlling a motor comprising:
a DC bus;
plural switching bridges coupled to the DC bus;
a controller operative to gate said switching bridges to generate a voltage signal to drive a motor;
a voltage to frequency converter coupled to said DC bus and being operative to generate a frequency signal having a frequency indicative of voltage of the DC bus;
an analog conversion circuit having a frequency to voltage converter and a summing junction and being coupled to said voltage to frequency converter to receive the frequency signal and convert the frequency signal to an output signal having a voltage that varies with the frequency of the frequency signal;

an analog to digital converter coupled to said analog frequency converter to convert the output signal to a digital signal;

a digital processor adapted to receive the frequency signal and the digital signal, calculate a reference signal based on the frequency signal, calculate a feedback signal based on the digital signal, and integrate the difference between the reference signal and the feedback signal to generate a digital correction signal; and a digital to analog converter coupled to said digital processor and said analog conversion circuit to convert the digital correction signal to an analog correction signal and input the analog correction signal to said summing junction of said analog conversion circuit to thereby correct DC offset in the output signal.

\* \* \* \* \*